May 5, 1959 — C. T. BLOOMQUIST — 2,884,991
REST AND THE LIKE FOR THE HEAD, BACK AND FEET
Filed Sept. 27, 1955 — 2 Sheets-Sheet 1

INVENTOR.
Clarence T. Bloomquist
BY
Eugene E. Stevens
Eugene E. Stevens, II
ATTORNEYS May 5, 1959    C. T. BLOOMQUIST    2,884,991
REST AND THE LIKE FOR THE HEAD, BACK AND FEET
Filed Sept. 27, 1955    2 Sheets-Sheet 2

INVENTOR.
Clarence T. Bloomquist
BY
Eugene E. Stevens
Eugene E. Stevens III
ATTORNEYS United States Patent Office 2,884,991
Patented May 5, 1959

2,884,991

REST AND THE LIKE FOR THE HEAD, BACK AND FEET

Clarence Theodore Bloomquist, Traverse City, Mich.

Application September 27, 1955, Serial No. 536,840

2 Claims. (Cl. 155—154)

My invention relates to rests and the like for the head, back, and feet, and has for its primary object to provide a device as characterized which can be readily applied to an automobile seat or chair back as a head rest, or employed as a foot rest or used as a backrest for beach or for television watching.

Long automobile trips can become very tiring to both front and back seat passengers, and primarily for lack of a suitable head rest. This applies especially to passengers who divide the driving and who try to catch naps between turns at the wheel. It is therefore one of the primary objects of the present invention to provide a head rest for both front and back seat passengers which can be readily disposed and held at any desired angle as an extension of the seat back, and which can be positioned out of the way beyond the top of the seat back when not in use.

More specifically stated, the invention in its preferred form comprises a flexible seat-providing mat or strip with an inclined brace-supported head or back rest adjacent one end, means being provided whereby the inclination of the rest may be controlled in one way or another when the device is to be used as either a head or back rest.

It is also an object of the invention to provide a foot rest which can be conveniently stored when not in use.

A further object of the invention is to provide a device of this kind which can be folded to reduced and compact size for convenient transport or storage.

Another object of the invention is to provide a multi-use rest which comprises a minimum of parts and thereby renders it simple and inexpensive to manufacture and to maintain in repair.

Other objects and advantages of the invention will be apparent during the course of the following description.

In the accompanying drawing, forming a part of this application, and in which like numerals are employed to designate like parts throughout the same, Figure 1 is a perspective view of my invention used as a head or back rest for beach and television use;

Figure 1:
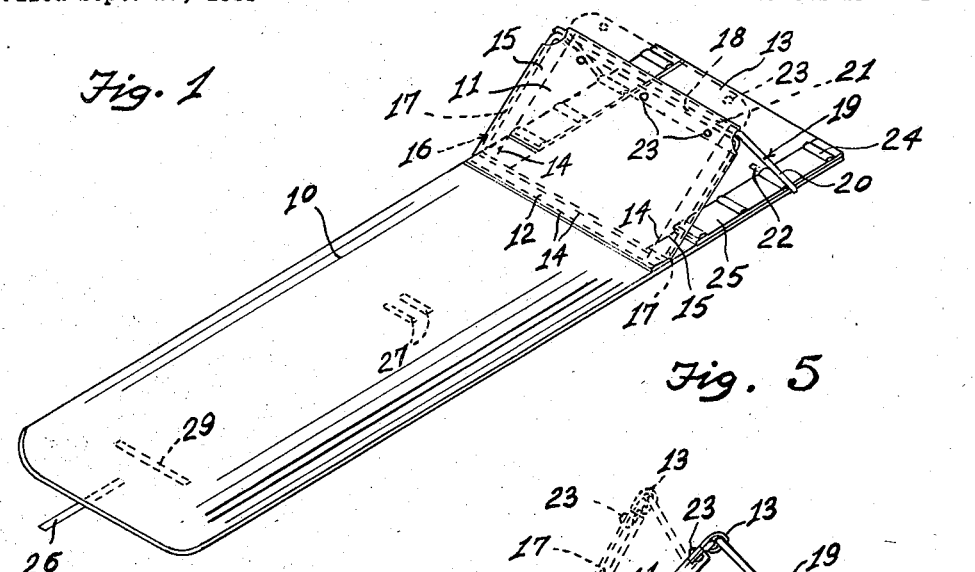

In the drawings wherein for the purpose of illustration is shown a preferred embodiment of my invention, the numeral 10 designates the flexible strip, or mat. A cover 11 providing a lower flap 12 and an upper flat 13 is fixed to the flexible strip 10 by any suitable means such as the stitching 14. Longitudinal pockets 15 are provided on opposite sides of the cover by any appropriate means such as stitching 14. U-shaped member 16 providing legs 17 and bight 18 is inserted in the cover 11 by placing the legs 17 in the pockets 15. A second inverted U-shaped member 19 having legs 20, a bight 21 and inturned feet 22 is positioned with its bight portion 21 resting against the bight 18 of the first inverted U-shaped member 16. The upper flap 13 of the cover 11 is folded down over the bights 18 and 21 and closed with any suitable means such as the snap fastener 23. The inturned feet 22 are selectively positioned in a series of loops 24 provided by a pair of flexible strips 25 affixed to the main flexible strip 10.

Figure 4:
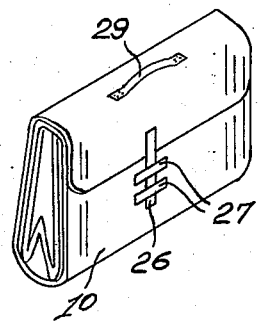
Figure 4 is a perspective view of the invention in the folded carrying case position.

The rest can be folded up into a carrying position (see Fig. 4). For this purpose a handle 29 is affixed to the flexible strip 10, together with a strap 26 and a pair of strap-secured keepers 27.

Figure 5:
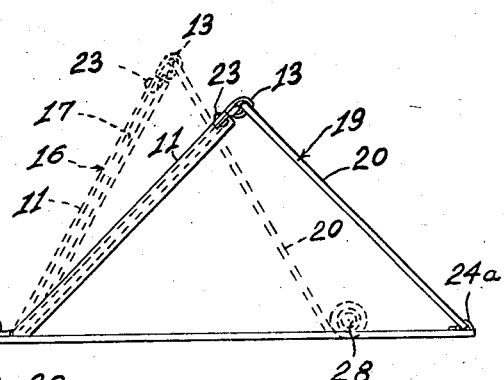
Figure 5 is a side elevational view of a modification of the invention.

In the modification shown in Fig. 5, only one loop 24a is provided, and it is attached to the flexible strip 10 to receive the inturned foot (not shown) of the leg 20 of the U-shaped member 19. The end of the flexible strip is rolled up as at 28 to adjustably position the inverted U-shaped member 19 and thereby enable the rest to be selectively positioned.

In operation, the rest when used for watching television is placed on the floor. The weight of the body on the mat 10 maintains the head rest portion in the proper position. The same is true when the rest is used on a beach or in the back yard. It will be noted that in addition to the adjustment by means of the loops 24, the angle can be further enlarged when using the rest outdoors by burying the legs and feet, 20 and 22, in the sand or ground, see Figs. 1 and 5.

Figure 2:
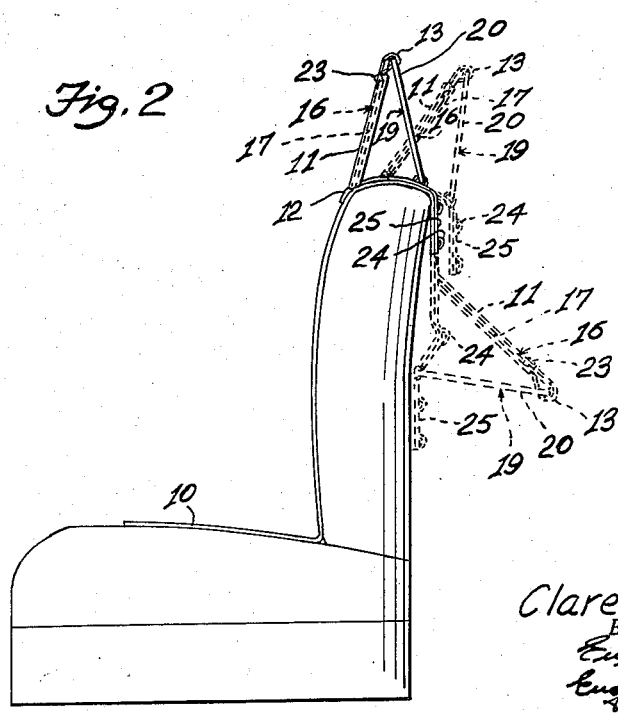
Figure 2 is a side elevational view showing the various positions of the invention when used as a head rest in an automobile, and the non-use position.

When the rest is used as a head rest in an automobile, the head rest is placed on the top of the automobile seat and the mat is positioned on the seat and the back thereof. In operation, the weight of the user on the mat maintains the head rest in any desired location on the top of the seat (see Fig. 2). When the device is not in use, it can be dropped behind the seat as shown in dotted lines in Fig. 2, and still be accessible to the passenger who need merely pull up the mat 10 to return the rest to operative position.

Figure 3:
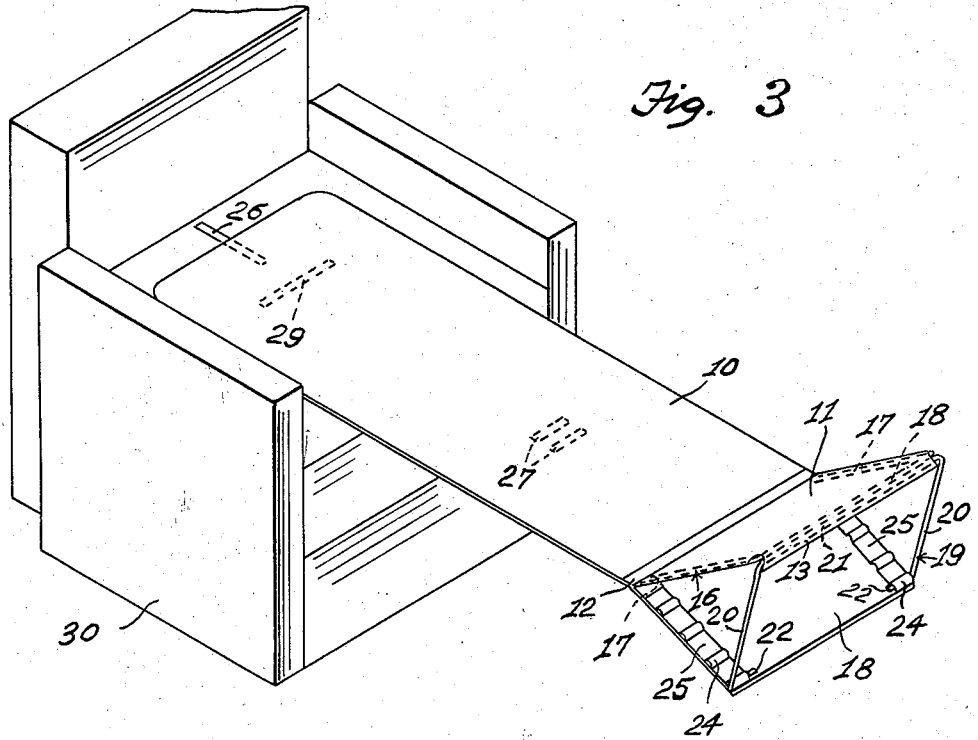
Figure 3 is a perspective view of the invention used as a foot rest.

To use the rest as a foot rest (Fig. 3), the mat 10 is placed on a chair or the like 30 and maintained in place by weight of the body, and the desired angle and distance are easily obtained by changing the position of the mat.

The handle 29, strap 26 and strap-securing keepers 27 are preferably made of lightweight material such as fabric, and enables the rest to be conveniently transported.

It is to be understood that the form of my invention herewith shown and described, is to be taken as a preferred example of the same, and that various changes in the shape, size and arrangement of parts may be resorted to without departing from the spirit or scope of my invention, as hereinafter claimed.

It will be noted from a reading of the foregoing specification in connection with the drawings that the frame is completely detachable from the fabric (unfastening the snap closures 23) thereby making it possible to clean the fabric easily.

Having thus described my invention, I claim:

1. A multi-purpose adjustable head rest-incorporating mat for automobile and beach use and for other purposes and comprising a flexible mat form body, a panel-like reinforcing means-incorporating rest, means pivotally connecting the inner end of said rest to said mat transversely thereof and inwardly of one end of the mat, a U-form brace member for sustaining said rest in different positions and having a bight portion and side legs, said side legs spaced apart a distance at least slightly greater than the width of said mat-form body, means adjacent the free outer end of the rest and pivotally connecting the same to the bight portion of said brace member at least adjacent each end of the latter, loop means provided by said mat-form body at each side and between said body-carried rest-pivoting means and the aforementioned mat end, aligned inturned bearings carried at the free ends of said brace members legs, said leg bearings removably received in said loop means from the outer ends of the latter, and said particularly mentioned mat body end being rollable toward said other end between and in substantial engagement with said legs and about said leg bearings and loop means as an axis, whereby the angular adjustment of the rest with respect to the mat body is effected, the weight of the user's body transmitted to the thus rolled mat body portion through said legs and bearings preventing unrolling of same, and said rest, when the brace member bearing portions and mat-carried keepers are disconnected, constituting a form-defining core about which the mat can be wound commencing with its rest-carrying end, and subsequently secured in a compact luggage item simulating package.

2. The structure of claim 1, and said mat body being of a length to provide a seat overlying portion and a seat back-overlying portions so that the mat portion between said rest pivot and loop means is supportable on the top of a seat back and so maintained by the user's body weight, said mat being shiftable lengthwise to dispose the rest in out of use position behind the seat back to be so retained by user's weight upon the seat overlying portion of the mat.

References Cited in the file of this patent

UNITED STATES PATENTS

| | | |
|---|---|---|
| D. 116,558 | Ficks | Sept. 12, 1939 |
| 305,428 | Covert | Sept. 23, 1884 |
| 1,842,424 | Ponten et al. | Jan. 26, 1932 |
| 1,865,030 | McCauley | June 28, 1932 |
| 2,208,945 | Miller | July 23, 1940 |
| 2,285,900 | Chapman | June 9, 1942 |
| 2,304,700 | Manville | Dec. 8, 1942 |
| 2,570,571 | Leeman | Oct. 9, 1951 |